United States Patent Office 3,782,918
Patented Jan. 1, 1974

3,782,918
CARBOXANILIDES AS HERBICIDES
Bryant Leonidas Walworth, Pennington, N.J., assignor to American Cyanamid Company, Stamford, Conn.
No Drawing. Filed Mar. 29, 1972, Ser. No. 239,365
Int. Cl. A01n 9/12
U.S. Cl. 71—98                 15 Claims

ABSTRACT OF THE DISCLOSURE

Carboxanilides of the formula:

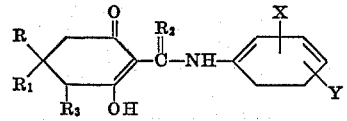

where R, $R_1$, and $R_3$ are hydrogen or alkyl $C_1$–$C_4$; $R_2$ is sulfur or oxygen; and X and Y are hydrogen, halogen, alkyl $C_1$–$C_4$, alkylthio $C_1$–$C_4$, alkoxy $C_1$–$C_4$, nitro or trihaloalkyl $C_1$–$C_4$, are useful for controlling undesirable plant species.

CROSS REFERENCE TO RELATED APPLICATIONS

Co-pending patent application Ser. No. 197,967, filed Nov. 11, 1971 "Dioxocyclohexane-Carboxanilide Insecticides and Acaricides" discloses the compounds useful in this invention.

BACKGROUND OF THE INVENTION

Field of the invention

The invention pertains to the use of certain organic chemicals as herbicides.

Description of the prior art

The compounds useful in this application are described in co-pending patent application Ser. No. 197,967, filed Nov. 11, 1971.

SUMMARY OF THE INVENTION

The invention is a novel method for controlling undesirable vegetation by applying a herbicidally effective amount of a compound having the structure:

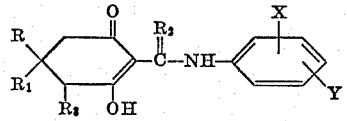

where R, $R_1$, and $R_3$ are hydrogen or alkyl of 1 to 4 carbons; $R_2$ is sulfur or oxygen; and X and Y are hydrogen, halogen, alkyl of 1 to 4 carbons, alkylthio of 1 to 4 carbons, alkoxy of 1 to 4 carbons nitro or trihaloalkyl of 1 to 4 carbons; to the foliage, stems and other plant parts of undesirable vegetation or to the soil containing seed of the vegetation.

DESCRIPTION OF THE PREFERRED EMBODIMENTS

The invention is a novel method for controlling undesirable plants by applying a herbicidally effective amount of a compound of the formula:

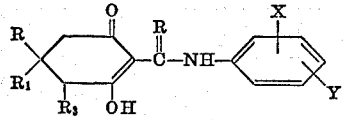

wherein R, $R_1$, and $R_3$ are hydrogen or alkyl of 1 to 4 carbons; $R_2$ is sulfur or oxygen; and X and Y are hydrogen, halogen, alkyl of 1 to 4 carbons, alkylthio of 1 to 4 carbons, alkoxy of 1 to 4 carbons; nitro and trihaloalkyl of 1 to 4 carbons; to the foliage, stems and other plant parts of undesirable plants.

Preferred herbicidal compounds having the above structure are those wherein R, $R_1$, and $R_3$ are hydrogen, methyl or ethyl; $R_2$ is sulfur or oxygen, and X and Y are hydrogen, halogen (including Cl, F, Br and I), methyl, ethyl, methoxy, methylthio, nitro and trifluoromethyl.

The process for the preparation of these carboxanilides involves the reaction of a 1,3-cyclohexanedione with a phenylisocyanate or a phenylisothiocyanate. The reaction is generally carried out in the presence of a tertiary organic amine, with or without an organic solvent. Elevated temperatures are generally employed to facilitate the reaction. Temperatures in the range of from about 30° C. to about 150° C. are generally suitable, with temperatures in the range of from about 50° C. to about 100° C. being preferred. Following the period of heating, which will usually be under reflux, the carboxanilide may be precipitated by the addition of an aqueous solution of mineral acid. The product may then be recovered from the mixture by any convenient means, as, for example, by filtration, centrifugation, or the like. If desired, purification can be effected by redissolving the product in a solvent of moderate polarity, such as ethyl ether, a $C_1$–$C_4$ alcohol, cyclohexane, methylene chloride, or the like, and filtering off the insoluble material. The desired carboxanilide can be recovered from the filtrate by evaporation. This synthetic reaction scheme may be graphically illustrated as follows:

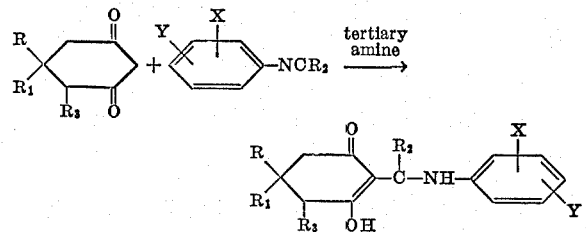

The isocyanates and isothiocyanates employed in the preparation of the carboxanilides may be conveniently prepared from the appropriate anilines by reaction with phosgene or thiophosgene. Typical procedures for these general reactions are set forth by S. Petersen et al., Chemische Berichte, 81, pp. 31–38 (1948), Chemical Abstracts, 43, p. 169a; E. Dyer et al., Journal of the American Chemical Society, 54, 777/87 (1932); Wagner and Zook, Synthetic Organic Chemistry, pp. 640 and 827–830. John Wiley and Sons, Inc. (1953).

As previously indicated, the compounds of this invention have utility as herbicidal agents. They are effective for controlling annual and perennial broadleaf weeds and grasses and are particularly effective when utilized as postemergence herbicides applied at the rate of from 0.25 pound to 25 pounds per acre, and preferably 0.5 pound to 10 pounds per acre of active compound.

For use in the field, these compounds may be formulated as dusts, dust concentrates, wettable powders, or the like. The dusts are usually prepared by simply grinding together from about 1% to 15% by weight of the active carboxanilide with a finely divided inert diluent such as walnut shell flour, ground corn cobs, pumice, diatomaceous earth, fullers earth, attaclay, talc, or kaolin. Dust concentrates are made in similar fashion, except that about 16% to 75% by weight of active ingredient is ground together with the diluent. In practice, this concentrate is then generally admixed at the site of use with more inert diluent before it is applied to the plant foliage which is to be controlled.

Wettable powders are generally prepared in the same manner as dust concentrates, but usually about 1% to 5% by weight of a dispersing agent, for example an alkali metal lignosulfonate and about 1% to 5% of a surfactant, such as alkyl phenoxy polyethylene ethanol, naphthalene sulfonic acid condensate, or an ester of sodium isothionate, is incorporated in the formulation. For application, the wettable power is usually dispersed in water and applied as a spray. Other inert liquid diluents such as a deodorized kerosene may, of course, be substituted for water where it is desired to do so.

The emulsifiable liquids may be prepared by dissolving the active compound in an organic solvent, such as acetone, and admixing the thus-formed solution with other organic solvents, such as cyclohexanone or toluene containing an emulsifier such as calcium dodecylbenzene sulfonate or an alkylaryl polyether alcohol. The emulsifiable liquid is then generally dispersed in water for spray application.

The present invention is further illustrated by the examples set forth below which are not to be taken as limitative thereof. In each case, parts are by weight unless otherwise indicated.

EXAMPLES 1 THROUGH 24

Preparation of 3',4'-dichloro-2-hydroxy-6-oxo-1-cyclohexene-1-carboxanilide and related compounds A solution containing 1,3-cyclohexanedione, 144 parts, 3,4-dichlorophenylisocyanate, 240 parts, in pyridine, 800 parts, is heated at 110° C. to 115° C. for two hours. After cooling, the mixture is poured with stirring into a solution containing 2000 parts of concentrated hydrochloric acid in 7500 parts of cold water. A solid forms which is collected and washed on the filter with cold water and dried in a vacuum oven at 50° C. The pure carboxanilide is obtained by crystallization from 7000 parts of ethyl alcohol to give 242 parts of light tan colored crystals, melting point 131° C. to 132° C.

The compounds of Table I having the structure set forth therein are prepared by essentially the same procedure using the appropriately substituted isocyanates in place of the 3,4-dichlorophenylisocyanate. Reaction periods vary from two to four hours at temperatures usually of 95° C. to 100° C. In cases where appreciable amounts of substituted carbanilides corresponding to the isocyanates are formed, purification is further effected by dissolving the carboxanilide in a solvent of moderate polarity, such as ethyl ether or methylene chloride, filtering off the insoluble carbanilide, and recovering the product from the filtrate, by evaporation of the solvent.

TABLE I

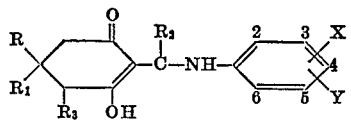

| Example number | R | $R_1$ | $R_2$ | $R_3$ | X | Y | Melting point, °C. | Recrystallization solvent |
|---|---|---|---|---|---|---|---|---|
| 2 | $CH_3$ | $CH_3$ | O | H | 3-Cl | 4-Cl | 135–136 | EtOH. |
| 3 | H | H | O | H | 3-Cl | 4-Cl | 131–132 | EtOH. |
| 4 | H | H | O | H | 3-Cl | H | 92.5–94 | EtOH. |
| 5 | H | H | O | H | H | 4-Cl | 113–114 | EtOH. |
| 6 | H | H | O | H | H | 4-I | 122–123 | 95% EtOH. |
| 7 | H | H | O | H | 2-Cl | 4-Cl | 174–175.5 | EtOH. |
| 8 | H | H | O | H | H | 4-$CH_3$ | 112.5–114 | EtOH. |
| 9 | $CH_3$ | $CH_3$ | O | H | 2-Cl | H | 86.5–88.5 | 95% EtOH. |
| 10 | $CH_3$ | $CH_3$ | O | H | 3-Cl | 4-$CH_3$ | 93.5–96 | 95% EtOH. |
| 11 | $CH_3$ | $CH_3$ | O | H | 2-Cl | 6-$CH_3$ | 151–153 | 95% EtOH. |
| 12 | $CH_3$ | H | O | H | H | 4-Cl | 122–123.5 | EtOH. |
| 13 | $CH_3$ | H | O | H | 3-Cl | 4-Cl | 126.5–128.5 | Acetone. |
| 14 | H | H | O | H | H | H | 78 | EtOH. |
| 15 | H | H | O | $C_2H_5$ | H | 4-Cl | 86–93 | MeOH. |
| 16 | H | H | O | H | 2-$C_2H_5$ | H | 78–80 | EtOH. |
| 17 | H | H | O | H | H | 4-Br | 104–105 | EtOH. |
| 18 | H | H | O | H | H | 4-F | 110–111 | EtOH. |
| 19 | H | H | O | H | H | 4-$SCH_3$ | 99–100 | EtOH. |
| 20 | H | H | O | H | 3-$CF_3$ | H | 102–103 | EtOH. |
| 21 | H | H | O | H | 3-F | H | 84–84.5 | EtOH. |
| 22 | H | H | O | H | 3-$CF_3$ | 3-$CF_3$ | 119–121 | EtOH. |
| 23 | H | H | O | H | 2-$CH_3$ | 3-Cl | 120.5–121.5 | EtOH. |
| 24 | H | H | O | H | 3-$NO_2$ | 4-Cl | 149.5–150.5 | EtOH. |

Note.—EtOH=ethyl alcohol, MeOH=methyl alcohol.

EXAMPLES 25 THROUGH 31

Preparation of 4'-chloro-2-hydroxy-6-oxo-1-cyclohexene-1-carboxanilide and related compounds

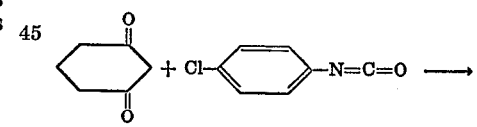

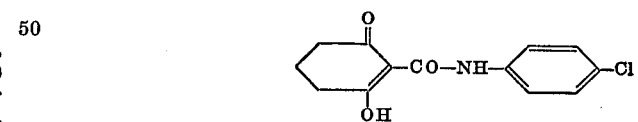

A solution containing 8.5 parts of cyclohexane-1, 3-dione, 11.5 parts of p-chlorophenylisocyanate and 7.6 parts of triethylamine in 200 parts of acetone is stirred and refluxed for two hours. The infrared spectrum then shows no isocyanate (band at 2270 cm.$^{-1}$). The solution

TABLE II

| Example number | R | $R_1$ | $R_2$ | $R_3$ | X | Y | Melting point, °C. | Recrystallization solvent |
|---|---|---|---|---|---|---|---|---|
| 26 | $CH_3$ | $CH_3$ | O | H | H | 4-$OCH_3$ | 101–104 | 95% EtOH. |
| 27 | H | H | O | H | 2-Cl | 3-Cl | 120–124 | 95% EtOH. |
| 28 | H | H | O | H | 2-Cl | H | 116.5–119 | 95% EtOH. |
| 29 | H | H | S | H | 3-F | H | 114–116.5 | 95% EtOH plus ether. |
| 30 | H | H | S | H | H | 4-F | 95–97 | 95% EtOH. |
| 31 | H | H | S | H | H | H | 78–80 | Hexane. | is concentrated under reduced pressure to about 50 parts, with separation of a few crystals, and poured with stirring into 500 parts of 2-normal hydrochloric acid. The precipitated solid is collected by filtration and dried. The resulting solid is mixed with chloroform, 250 parts by volume, and filtered from 6.5 parts of insoluble by-product. Removal of chloroform from the filtrate leaves a light pink solid which is crystallized from alcohol to give 6.7 parts of nearly white solid, melting point 113° C. to 114° C.

*Analysis.*—Calculated for $C_{13}H_{12}ClNO_3$ (percent): C, 58.76; H, 4.56; Cl, 13.34; N, 5.27. Found (percent): C, 58.74; H, 4.55; Cl, 13.16; N, 4.97.

The same product is obtained as a light red powder when the reaction is run in pyridine. Yield, 11.6 parts of recrystallized product.

The compounds of Table II, having the structure set forth therein are prepared by essentially the same procedure, using the appropriately substituted phenylisocyanates for the p-chlorophenylisocyanate used therein.

EXAMPLE 32

The postemergence herbicidal activity of the compounds of the invention is demonstrated by the following tests, wherein a variety of monocotyledonous and dicotyledonous plants are treated with test compounds dispersed in aqueous acetone mixtures. In the tests, seedling plants are grown in jiffy flats for about two weeks. The test compounds are dispersed in 50/50 acetone/water mixtures, containing 0.5% of polyoxyethylene sorbitan monolaurate as a wetting agent, in sufficient quantity to provide the equivalent of about 0.5 to 10 pounds per acre of active compound when applied to the plants through a spray nozzle operating at 40 p.s.i. for a predetermined time. After spraying, the plants are placed on greenhouse benches and are cared for in the usual manner, commensurate with conventional greenhouse practices. Two weeks after treatment, the seedling plants are examined and rated according to the rating system provided below. The data obtained are reported in Table III where it can be seen that the compounds are highly effective for the control of a wide variety of annual and perennial broadleaf weeds and grasses.

Rating system:      Percent difference in growth from the check [1]
- 0—no effect .......... 0
- 1—possible effect .......... 1–10
- 2—slight effect .......... 11–25
- 3—moderate effect .......... 26–40
- 4 .......... ([2])
- 5—definite injury .......... 41–60
- 6—herbicidal effect .......... 61–75
- 7—good herbicidal .......... 76–90
- 8—approaching complete kill .......... 91–99
- 9—complete kill .......... 100

[1] Based on visual determination of stand, size, vigor, chlorosis, growth malformation and over-all plant appearance.
[2] Abnormal growth, i.e. a definite physiological malformation but with an over-all effect less than a 5 on the rating scale.

PLANT ABBREVIATIONS

AW—Alligator weed
BW—Bindweed
CT—Canada thistle
JG—Johnson grass
NS—Nutsedge
QG—Quack grass
KO—Kochia
LA—Lamb's quarters
MU—Mustard
PI—Pigweed
RAG—Ragweed
BA—Barnyard grass
CR—Crabgrass
GRF—Green foxtail
WO—Wild oats
COR—Corn
COT—Cotton
SOY—Soybean
SB—Sugar beets TABLE III—Continued

| Structure | Treatment, lb./acre | Perennial weeds | | | | | | | Annual weeds | | | | | | | Crops | | | |
|---|---|---|---|---|---|---|---|---|---|---|---|---|---|---|---|---|---|---|---|
| | | AW | BW | CT | JG | NS | QG | KO | LA | MU | PI | RAG | BA | CR | GRF | WO | COR | COT | SOY | SB |
| 4-I-phenyl carboxamide cyclohexanedione | 10 | -- | -- | -- | -- | -- | -- | -- | 9 | 3 | 4 | -- | 0 | 1 | -- | 1 | -- | -- | -- | -- |
| 2-Cl,4-Cl-phenyl carboxamide cyclohexanedione | 10 / 2 | 0 / 0 | 0 / 0 | 0 / 1 | 0 / 0 | 0 / 0 | 0 / 0 | -- | 8 / 0 | 1 / 0 | 7 / 9 | -- | 1 / 1 | 3 / 3 | 1 / 1 | 0 / 0 | -- | -- | -- | -- |
| 4-CH₃-phenyl carboxamide cyclohexanedione | 10 / 3 / 2 | 1 / -- / 1 | 1 / 5 / 5 | 9 / -- / 1 | 0 / -- / 0 | 0 / -- / 0 | 0 / -- / 0 | -- / -- / 9 | 9 / 9 / 9 | 9 / 9 / 8 | 9 / 9 / 8 | -- | 7 / 3 / 5 | 2 / 2 / 2 | 7 / 9 / 6 | 1 / 2 / 1 | -- | -- | -- | -- |
| 3-Cl-phenyl carboxamide dimethylcyclohexanedione | 10 / 3 / 2 | 9 / -- / 3 | 8 / 9 / 9 | 9 / -- / 9 | 2 / -- / 0 | 0 / -- / 0 | 0 / -- / 1 | -- | 9 / 9 / 9 | 9 / 9 / 9 | 9 / 9 / 1 | 9 / 1 / 2 | 2 / 1 / 2 | 2 / 1 / 9 | 9 / 1 / 1 | 5 / 1 / 1 | -- / 1 / 2 | -- / 9 / 9 | -- / -- / 5 | -- |
| 4-Cl,3-CH₃-phenyl carboxamide dimethylcyclohexanedione | 10 | -- | -- | -- | -- | -- | -- | -- | 8 | 8 | 1 | 1 | 1 | 1 | -- | 1 | -- | -- | -- | -- |
| 2-Cl,6-CH₃-phenyl carboxamide dimethylcyclohexanedione | 10 | -- | -- | -- | -- | -- | -- | -- | 8 | 2 | 1 | 1 | 1 | 0 | 1 | 0 | -- | -- | -- | -- |
| 4-Cl-phenyl carboxamide dimethylcyclohexanedione | 10 / 3 / 1 | 10 / 3 / 1 | -- | -- | -- | -- | -- | -- | 9 / 9 / 3 | 9 / 9 / 8 | 9 / 3 / 3 | -- / 5 / 8 | 9 / 5 / 2 | 3 / 3 / 0 | -- / 6 / 8 | 6 / 5 / 1 | 1 / 1 / -- | -- / 6 / 5 | -- / 2 / 2 | -- / -- / 9 |
| 3-Cl,4-Cl-phenyl carboxamide dimethylcyclohexanedione | 10 / 3 / 1 | 10 / 3 / 1 | -- | -- | -- | -- | -- | -- | 9 / 7 / 3 | 9 / 9 / 8 | 9 / 3 / 5 | -- / 2 / 3 | 2 / 1 / 0 | 2 / 0 / 0 | -- / 0 / 3 | 1 / 1 / 0 | 0 / 0 / -- | -- / 0 / 3 | -- / 2 / 2 | -- / -- / 1 |

TABLE III—Continued

| Structure | Treatment, lb./acre | Perennial weeds | | | | | | | Annual weeds | | | | | | | | | Crops | | | |
|---|---|---|---|---|---|---|---|---|---|---|---|---|---|---|---|---|---|---|---|---|---|
| | | AW | BW | CT | JG | NS | QG | KO | LA | MU | PI | RAG | BA | CR | GRF | WO | COR | COT | SOY | SB |
| 2-(phenylcarbamoyl)-cyclohexane-1,3-dione (C₆H₅) | 10 / 3 / 1 | 10 / --- / --- | 6 / --- / --- | 3 / --- / --- | 6 / --- / --- | 6 / --- / --- | 3 / --- / --- | --- / --- / 9-8 | 9/9/9 | 9/9/6 | 9/9/9 | --- / --- / --- | 9/8/3 | 9/1/6 | --- / 7/6 | 8/1/1 | 8/1/3 | 9/9/1 | 9/1/1 | --- / 7/1 |
| 4-Cl | 10 / 4 / 1 | 9/9 | 9/9 | 9/9 | 9/3/2 | 0/0 | 0 | | 9/9/7 | 9/9/9 | 9/9/9 | 9/9/9 | 6/2/1 | 1/2/1 | 3/5/2 | 6/1/0 | 9/1 | 9/7 | 4/7/6 | ---/---/9 |
| 2-C₂H₅ | 10 / 3 / 1 | 9/9 | 9/9 | 9/9 | 9/3 | 0 | 2/2 | | 9/9/9 | 9/9/9 | 9/9/9 | 9/9/9 | 7/5/3 | 6/8/5 | 7/9/9 | 2/5/2 | 5/7 | 9/8 | 9/3/3 | ---/---/9 |
| 4-Br | 10 / 2 / 1 | 9/9 | 9/9 | 9/9 | 9/5 | 0 | 3 | | 9/9/9 | 9/9/9 | 9/9/8 | 9/2/9 | 9/5/2 | 7/5/5 | 9/9/5 | 3/2/3 | 8 | 8 | 9/3 | ---/---/9 |
| 4-F | 10 / 3 / 1 | 9/7/2 | 9/1/1 | 9/3/0 | 9/1/0 | 3 | 1 | | 9/9/9 | 9/9/8 | 9/9/7 | 9/9/1 | 7/7/3 | 7/5/7 | 9/9/7 | 3/5/2 | 7/7 | 9/9 | 9/7/3 | 9/9/7 |
| 4-SCH₃ | 10 / 3 / 0.5 | 9/--/-- | 9/2/-- | 9/3/-- | 9/--/-- | 3 | 1 | | 9/9/9 | 9/9/0 | 9/9/1 | 9/9/5 | 9/6/0 | 7/5/1 | 7/5/3 | 9/7/3 | 9/1/0 | 9/7/2 | 9/9 | 9/3/2 | 5/3/1 | 8/3/2 |
| 3-CF₃ | 10 / 3 / 0.5 | 9/--/-- | 9/--/-- | 9/--/-- | 9/--/-- | 9 | 8 | | 9/9/9 | 9/9/1 | 9/9/5 | 9/9/2 | 9/7/3 | 9/1/0 | 9/8/7 | 5/3/1 | 7/3/--- | 9/9 | 9/9 | 9/9 |
| 3-F | 10 / 3 / 0.5 | 9/--/-- | 9/--/-- | 9/--/-- | 9/--/-- | | | | 9/9/9 | 9/9/1 | 9/9/5 | 9/9/2 | 9/7/3 | 9/1/0 | 9/8/7 | 7/3/1 | 9/3 | 9/9 | 9/9 | 9/9 |

TABLE III—Continued

| Structure | Treatment, lb./acre | Perennial weeds | | | | | | | Annual weeds | | | | | | | | Crops | | |
|---|---|---|---|---|---|---|---|---|---|---|---|---|---|---|---|---|---|---|---|
| | | AW | BW | CT | JG | NS | QG | KO | LA | MU | PI | RAG | BA | CR | GRF | WO | COR | COT | SOY | SB |
| 3,5-(CF₃)₂-C₆H₃-NH-CO- (2-hydroxycyclohex-1-en-1-yl) | 10 | 1 | 9 | 6 | 1 | 7 | 0 | — | 9 | 9 | 9 | 9 | 9 | 9 | 9 | 2 | — | — | — | — |
| | 2 | 1 | 0 | 9 | 1 | 0 | 0 | — | 9 | 9 | 9 | 2 | 9 | 9 | 9 | 1 | — | — | — | — |
| 3-Cl-4-NO₂-C₆H₃-NH-CO- | 10 | 0 | 3 | 8 | 0 | 0 | 0 | — | 1 | 7 | 3 | 3 | 9 | 7 | 9 | 1 | 3 | 7 | 8 | 0 |
| | 2 | 0 | 1 | 2 | 0 | 0 | 0 | — | 1 | 9 | 9 | 9 | 3 | 1 | 3 | 0 | — | — | — | — |
| | 1 | — | — | — | — | — | — | — | 3 | 0 | 1 | 0 | 3 | 1 | 1 | — | — | — | — | 7 |
| | 0.5 | — | — | — | — | — | — | — | — | — | — | — | — | — | — | — | 3 | 3 | 3 | — |
| 2-Cl-3-CH₃-C₆H₃-NH-CO- | 10 | 1 | 9 | 9 | 1 | 0 | 0 | — | 9 | 9 | 9 | 3 | 5 | 6 | 9 | 3 | 2 | 2 | 3 | — |
| | 2 | 1 | 9 | 3 | 1 | 0 | 0 | — | 9 | 9 | 9 | 2 | 3 | 5 | 3 | 2 | — | — | — | — |
| | 1 | — | — | — | — | — | — | — | 1 | 5 | 2 | 0 | 6 | 1 | 1 | 0 | — | — | — | — |
| 4-OCH₃-C₆H₄-NH-CO- (2-hydroxy-4,4-dimethylcyclohex-1-en-1-yl) | 10 | 0 | 9 | 3 | 1 | 0 | 0 | — | 8 | 9 | 9 | 1 | 7 | 6 | 8 | 2 | 2 | 8 | 5 | 2 |
| | 2 | 1 | 9 | 9 | 1 | 0 | 0 | — | 2 | 9 | 9 | 0 | 2 | 3 | 3 | 1 | — | — | — | — |
| | 1 | — | — | — | — | — | — | — | 2 | 5 | 2 | 0 | 2 | 1 | 1 | 0 | — | — | — | — |
| 2,3-Cl₂-C₆H₃-NH-CO- | 10 | 2 | 9 | 9 | 2 | 0 | 0 | — | 8 | 9 | 9 | 1 | 6 | 1 | 8 | 2 | 2 | 7 | 3 | 0 |
| | 2 | 1 | 9 | 5 | 0 | 0 | 0 | — | 7 | 9 | 9 | 3 | 2 | 1 | 3 | 1 | — | — | — | — |
| | 1 | — | — | — | — | — | — | — | 6 | 1 | 2 | 0 | 1 | 1 | 1 | 0 | — | — | — | — |
| 2-Cl-C₆H₄-NH-CO- | 10 | 1 | 9 | 9 | 1 | 0 | 9 | — | 9 | 9 | 9 | 3 | 3 | 1 | 2 | 2 | 7 | — | 3 | — |
| | 2 | 1 | 1 | 1 | 1 | 0 | 0 | — | 2 | 9 | 7 | 1 | 1 | 1 | 3 | 1 | — | — | — | — |
| | | | | | | | | | | | | | | | | | | | | |
| 2-F-C₆H₄-NH-CS- | 10 | 1 | 9 | 3 | 2 | 0 | 0 | — | 9 | 9 | 8 | 9 | 9 | 2 | 9 | 2 | 6 | 8 | 3 | 0 |
| | 2 | 1 | 1 | 2 | 0 | 0 | 0 | — | 2 | 9 | 1 | 3 | 1 | 1 | 3 | 0 | — | — | — | — |
| 4-F-C₆H₄-NH-CS- | 10 | 0 | 1 | 9 | 0 | 0 | 0 | — | 7 | 9 | 9 | 8 | 2 | 2 | 5 | 2 | 2 | 5 | 3 | 0 |
| | 2 | 0 | 0 | 5 | 0 | 0 | 0 | — | 2 | 9 | 7 | 1 | 1 | 1 | 2 | 1 | — | — | — | — |
| C₆H₅-NH-CS- | 10 | — | 1 | 9 | 0 | 0 | 0 | 9 | 6 | 9 | 9 | 9 | 1 | 1 | — | 1 | 1 | — | — | — |
| | 5 | — | 1 | 0 | 0 | 0 | 0 | 0 | 9 | 9 | 9 | 1 | 1 | 0 | 5 | 1 | 0 | — | — | — |
| | 1 | — | 0 | 0 | 0 | 0 | 0 | 0 | 0 | 0 | 0 | 0 | 0 | 0 | 0 | 0 | — | — | — | — |

I claim:
1. A method for postemergence control of undesirable plants which comprises
applying to the foliage of the plants a herbicidally effective amount of a compound of the formula:

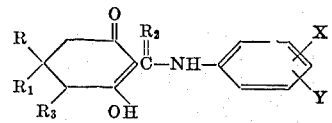

wherein R, $R_1$ and $R_3$ are hydrogen or alkyl of 1 to 4 carbons; $R_2$ is sulfur or oxygen; and X and Y are hydrogen, halogen, alkyl of 1 to 4 carbons, alkylthio of 1 to 4 carbons alkoxy of 1 to 4 carbons, nitro or trihaloalkyl of 1 to 4 carbons.

2. A method according to claim 1 wherein R, $R_1$, and $R_3$ are hydrogen, methyl or ethyl; $R_2$ is sulfur or oxygen; X and Y are hydrogen, halogen, methyl, ethyl, methoxy, thiomethyl, nitro or trifluoromethyl.

3. A method according to claim 2 wherein the compound is applied at the rate of 0.25 pound per acre to 25 pounds per acre.

4. A method according to claim 3 wherein the compound is 2-hydroxy-6-oxo-1-cyclohexene - 1 - carboxy-p-toluidide.

5. A method according to claim 3 wherein the compound is 3'-chloro-2-hydroxy-4,4-dimethyl-6-oxo-1-cyclohexene-1-carboxanilide.

6. A method according to claim 3 wherein the compound is 4'-chloro - 2 - hydroxy-4-methyl-6-oxo-1-cyclohexene-1-carboxanilide.

7. A method according to claim 3 wherein the compound is 2' - ethyl-2-hydroxy-6-oxo-1-cyclohexene-1-carboxanilide.

8. A method according to claim 3 wherein the compound is 4'-fluoro-2-hydroxy-6-oxo - 1 - cyclohexene-1-carboxanilide.

9. A method according to claim 3 wherein the compound is 2 - hydroxy-4'-(methylthio)-6-oxo-1-cyclohexene-1-carboxanilide.

10. A method according to claim 3 wherein the compound is $\alpha,\alpha,\alpha$-trifluoro-2-hydroxy - 6 - oxo-1-cyclohexene-1-carboxy-m-toluidide.

11. A method according to claim 3 wherein the compound is 3'-fluoro - 2 - hydroxy-6-oxo-1-cyclohexene-1-carboxanilide.

12. A method according to claim 3 wherein the compound is $\alpha,\alpha,\alpha,\alpha',\alpha',\alpha'$-hexafluoro-2-hydroxy - 6 - oxo-1-cyclohexene-1-carboxy-3',5'-xylidide.

13. A method according to claim 3 wherein the compound is 3'-chloro-2-hydroxy - 6 - oxo-1-cyclohexene-1-carboxy-o-toluidide.

14. A method according to claim 3 wherein the compound is 4'-bromo-2-hydroxy - 6 - oxo-1-cyclohexene-1-carboxanilide.

15. A method according to claim 3 wherein the compound is 3',4'-dichloro-2-hydroxy-4,4-dimethyl - 6 - oxo-1-cyclohexene-1-carboxanilide.

References Cited
UNITED STATES PATENTS

| 3,362,992 | 1/1968 | Schwartz | 71—118 |
| 3,439,018 | 4/1969 | Brookes et al. | 71—118 |

FOREIGN PATENTS

| 1,061,718 | 3/1967 | Great Britain | 71—118 |

OTHER REFERENCES

Ukita et al.: "Antibacterial Props. of Compounds, Etc." (1953), CA, 49, p. 8269 (1955).

Goerdeler et al.: "Isothiazoles. V. Synthesis of Benzothiazoles, Etc.," (1964), CA, 61, pp. 11983–84 (1964).

GLENNON H. HOLLRAH, Primary Examiner

U.S. Cl. X.R.

71—118; 260—557 R